Patented Mar. 15, 1932

1,849,569

UNITED STATES PATENT OFFICE

PIETRO CONDORELLI AND BIAGIO ANTONINO COCO, OF CATANIA, ITALY

PROCESS FOR EXTRACTING THE JUICE FROM LIQUORICE

No Drawing. Application filed October 3, 1929, Serial No. 397,148, and in Italy August 26, 1929.

There is now in the industrial process of treatment of liquorice a serious mistake which forms the principal cause not only of the scarce yield of juice from the liquorice roots as compared with what it should be, but also of the too small percentage of glycyrrhizin, i. e. the active principle, contained in the juice produced.

The treatment of liquorice comprises first comminuting and crushing the liquorice roots so as to obtain a pasty mass, and then boiling same in a boiler for many hours. The said mass or pulp is then pressed, boiled a second time in a boiler similar to the first one, so as to thoroughly exhaust the liquorice. In the past (this industry being known for more than a century) attempts have been made for still further exhausting the liquorice juice by a third boiling, but a very poor yield was thereby obtained, such as not to compensate cost of fuel. Thus the third boiling was abandoned and only two boilings used.

As to the above mentioned mistake in treating liquorice root, we now may say that it consists in too long boilings of the liquorice roots but, on the other hand, such protracted boiling is indispensable because otherwise the yield would be prohibitively low.

The active principle of liquorice is glycyrrhizin, a glucoside which in nature is found in the condition of glycyrrhizinate of potassium, and in a small proportion in the condition of a calcium salt. The water applied thereto has a hydrolizing action, increasing considerably with boiling so that the potassium salt, being a chemical combination of a weak organic acid and a strong base, is strongly affected by the hydrolysis.

The scission products formed with water are potassium hydrate, which is a soluble compound, and glycyrrhizinic acid which is an insoluble compound remaining adherent to the liquorice pulp or cellulose. Neither is it possible that after the boiling of the water being completed the reverse phenomenon may occur between the glycyrrhizinic acid and the potassium hydrate, because the concentration of the latter is very weak, and therefore the reverse reaction cannot take place.

Now, the purpose of our present invention is to correct the above mentioned mistake. We have found by study and practical experience that in order to obtain from the exhausted liquorice roots a juice with a high tenor of glycyrrhizin, an ammonia solution, or ammonia salts or a mixture of such solution and salts is to be used.

Our new and improved process may be illustrated by the following example, out of many.

2500 kg. of liquorice root exhausted by the usual processes are treated, as soon as taken from the press, with four cubic meters of water containing 2% of ammonia. The whole is thoroughly mixed together and boiled for half an hour. Soon afterwards the root impregnated with liquid is pressed, filtered and concentrated up to obtaining a highly syrupy mass in a manner as ordinarily used for the concentrations of liquorice juice. The said quantity of root supposed to be exhausted still yields 100 kg. of juice with a proportion of glycyrrhizin, i. e. the active principle, of 28–30%.

Having now particularly described and ascertained the nature of our invention and in what manner the same is to be performed, we declare that what we claim is:—

1. Improved process for the further extracting of liquorice juice from spent liquorice roots, comprising the use of an ammonia solution, the ammonia being in a proportion of about 2% of the quantity of water used, boiling the whole for about half an hour, pressing the mass thus obtained, and concentrating the liquid up to obtaining a highly syrupy mass.

2. Improved process for the further extracting of liquorice juice from spent liquorice roots, comprising the use of ammonia salts in the proportion of about 2% of the quantity of water used, boiling the whole for about half an hour, pressing the mass thus obtained, and concentrating the liquid up to obtaining a highly syrupy mass.

3. Improved process for the further extracting of liquorice juice from spent liquorice roots comprising the use of a mixture of ammonia solution and ammonia salts in the proportion of about 2% of the quantity of water used, boiling the whole for about half an hour, pressing the mass thus obtained, and concentrating the liquid up to obtaining a highly syrupy mass.

PIETRO CONDORELLI.
BIAGIO ANTONINO COCO.